(12) United States Patent
Boblett et al.

(10) Patent No.: US 12,287,216 B2
(45) Date of Patent: Apr. 29, 2025

(54) HIGH-DEFINITION ENERGY CONSUMPTION MAP FOR VEHICLES

(71) Applicant: Rivian IP Holdings, LLC, Plymouth, MI (US)

(72) Inventors: Brennan Matthew Boblett, Orinda, CA (US); Jason Meyer Quint, Ann Arbor, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 155 days.

(21) Appl. No.: 17/961,450

(22) Filed: Oct. 6, 2022

(65) Prior Publication Data
US 2024/0118098 A1 Apr. 11, 2024

(51) Int. Cl.
*G01C 21/34* (2006.01)
*B60K 35/28* (2024.01)
(Continued)

(52) U.S. Cl.
CPC .......... *G01C 21/3469* (2013.01); *B60K 35/28* (2024.01); *G01C 21/3415* (2013.01);
(Continued)

(58) Field of Classification Search
CPC ............ G01C 21/3415; G01C 21/3469; G01C 21/3476; G01C 21/3617; G01C 21/3667;
(Continued)

(56) References Cited

U.S. PATENT DOCUMENTS

| | | | | |
|---|---|---|---|---|
| 5,539,399 A | * | 7/1996 | Takahira | G01C 21/3469 |
| | | | | 340/636.15 |
| 2003/0006914 A1 | * | 1/2003 | Todoriki | B60L 53/64 |
| | | | | 701/423 |

(Continued)

FOREIGN PATENT DOCUMENTS

| | | | | |
|---|---|---|---|---|
| JP | H11180185 A | * | 12/1997 | |
| JP | 2002350152 A | * | 12/2002 | ......... G01C 21/3469 |

(Continued)

OTHER PUBLICATIONS

Wilson, G. (Jul. 29, 2022). "How to accurately predict range in a Tesla", Greg's Ramblings, located at: https://www.gregsramblings.com/how-to-accurately-predict-range-in-a-teslajune-01-2020/, retrieved on Nov. 28, 2022.

*Primary Examiner* — John M Zaleskas
(74) *Attorney, Agent, or Firm* — Patterson + Sheridan, LLP (57) ABSTRACT

An in-vehicle control system for providing an energy consumption map for a vehicle is provided. The method includes displaying, on a display of a computing system of the vehicle, a map of an environment external to the vehicle. The map includes a predicted drive path extending between an initial location of the vehicle and a final destination of the vehicle within the environment. The method further includes generating, by the computing system, and based on the predicted drive path, a prediction of the energy consumption of the vehicle along the one or more trajectories of the predicted drive path, and displaying, on the display of the (Continued)

computing system, the predicted energy consumption of the vehicle along the one or more trajectories of the predicted drive path. The predicted energy consumption of the vehicle is displayed so as to at least partially overlay the predicted drive path.

17 Claims, 7 Drawing Sheets

(51) Int. Cl.
  *B60L 58/12* (2019.01)
  *G01C 21/00* (2006.01)
  *G01C 21/36* (2006.01)

(52) U.S. Cl.
  CPC ....... *G01C 21/3617* (2013.01); *G01C 21/367* (2013.01); *G01C 21/3673* (2013.01); *G01C 21/3676* (2013.01); *G01C 21/3697* (2013.01); *G01C 21/3856* (2020.08); *G01C 21/3896* (2020.08); *B60L 58/12* (2019.02); *B60L 2240/622* (2013.01); *B60L 2240/70* (2013.01); *B60L 2250/16* (2013.01); *B60L 2260/52* (2013.01); *B60L 2260/54* (2013.01)

(58) Field of Classification Search
  CPC .............. G01C 21/367; G01C 21/3673; G01C 21/3682; G01C 21/3856; G01C 21/3896; B60L 2250/16; B60L 2260/54
  See application file for complete search history.

(56) References Cited

U.S. PATENT DOCUMENTS

| | | | | |
|---|---|---|---|---|
| 2005/0216191 A1* | 9/2005 | Sumizawa | ........... | G01C 21/367 701/442 |
| 2007/0021909 A1* | 1/2007 | Matsuda | ........... | G01C 21/3469 701/532 |
| 2008/0221787 A1* | 9/2008 | Vavrus | ............. | G01C 21/3469 701/423 |
| 2008/0294339 A1* | 11/2008 | Tauchi | .............. | G01C 21/3469 701/123 |
| 2009/0157289 A1* | 6/2009 | Graessley | ................. | B60L 3/12 701/29.5 |
| 2010/0087977 A1* | 4/2010 | Bonne | ................. | G01C 21/3676 701/22 |
| 2010/0088012 A1* | 4/2010 | O'Sullivan | ........ | G01C 21/3469 701/532 |
| 2010/0106401 A1* | 4/2010 | Naito | ....................... | B60L 53/00 701/533 |
| 2010/0286909 A1* | 11/2010 | Tate, Jr. | ............... | G01C 21/3446 180/65.21 |
| 2011/0060495 A1* | 3/2011 | Kono | ................. | G01C 21/3469 701/31.4 |
| 2011/0077854 A1* | 3/2011 | Fushiki | ............... | G01C 21/3469 701/533 |
| 2011/0184642 A1* | 7/2011 | Rotz | ................... | G01C 21/3469 701/533 |
| 2011/0238287 A1* | 9/2011 | Hayashi | .............. | G01C 21/3682 701/532 |
| 2011/0238457 A1* | 9/2011 | Mason | ........... | G06Q 10/063112 705/7.14 |
| 2011/0246061 A1* | 10/2011 | Hayashi | ............. | G01C 21/3469 701/533 |
| 2011/0288765 A1* | 11/2011 | Conway | ........... | G08G 1/096816 701/533 |
| 2011/0309926 A1* | 12/2011 | Eikelenberg | ....... | G01C 21/3469 340/439 |
| 2012/0016576 A1* | 1/2012 | Huang | ............... | G01C 21/3469 701/423 |
| 2012/0022904 A1* | 1/2012 | Mason | ............. | G06Q 10/06311 705/333 |
| 2012/0179361 A1* | 7/2012 | Mineta | ............... | G01C 21/3469 701/410 |
| 2012/0316781 A1* | 12/2012 | Krauss | ................ | G01C 21/3667 701/454 |
| 2013/0018538 A1* | 1/2013 | Miura | ................. | G01C 21/3617 903/930 |
| 2013/0018573 A1* | 1/2013 | Miura | ................. | G01C 21/3469 701/123 |
| 2013/0046466 A1* | 2/2013 | Yucel | ................... | G01C 21/3469 701/538 |
| 2013/0096818 A1* | 4/2013 | Vicharelli | ............. | B60W 40/10 701/423 |
| 2013/0158849 A1* | 6/2013 | Maura | ................ | G01C 21/3697 701/123 |
| 2013/0179057 A1* | 7/2013 | Fisher | .................... | B60L 53/66 701/1 |
| 2013/0282265 A1* | 10/2013 | Arita | ....................... | B60L 1/003 701/123 |
| 2013/0282272 A1* | 10/2013 | Kluge | ................ | G01C 21/3469 701/425 |
| 2013/0345976 A1* | 12/2013 | Li | ....................... | G01C 21/3476 701/533 |
| 2014/0046585 A1* | 2/2014 | Morris, IV | ........... | G06Q 10/047 701/400 |
| 2014/0046595 A1* | 2/2014 | Segawa | .................. | G01C 21/34 701/400 |
| 2014/0074391 A1* | 3/2014 | Tate, Jr. | ................. | B60L 50/61 701/400 |
| 2014/0172292 A1* | 6/2014 | McGee | ............. | G01C 21/3605 701/418 |
| 2014/0214321 A1* | 7/2014 | Kawamata | ......... | G01C 21/3476 340/901 |
| 2014/0236403 A1* | 8/2014 | Liu | ........................... | B60L 3/12 701/123 |
| 2014/0236404 A1* | 8/2014 | Liu | ........................... | B60L 3/12 701/22 |
| 2014/0236467 A1* | 8/2014 | Liu | ........................... | B60L 3/12 701/123 |
| 2014/0277971 A1* | 9/2014 | Oshiro | ..................... | G07C 5/00 701/99 |
| 2015/0039215 A1* | 2/2015 | Wu | ..................... | G01C 21/3415 701/123 |
| 2015/0088414 A1* | 3/2015 | Mason | ............... | G01C 21/3484 701/423 |
| 2015/0154638 A1* | 6/2015 | Burlingham | ....... | G01C 21/3469 705/14.57 |
| 2015/0177009 A1* | 6/2015 | Saito | ....................... | G01C 21/34 701/424 |
| 2015/0213657 A1* | 7/2015 | Tanaka | ................... | G06Q 10/06 701/123 |
| 2015/0233729 A1* | 8/2015 | Arita | ....................... | G06F 17/00 701/22 |
| 2015/0258912 A1* | 9/2015 | Kuhn | .................... | B60W 50/085 701/22 |
| 2015/0316389 A1* | 11/2015 | Inoue | ................. | G01C 21/3469 701/521 |
| 2015/0345972 A1* | 12/2015 | Saito | ....................... | G01C 21/36 701/521 |
| 2015/0345977 A1* | 12/2015 | Saito | ....................... | B60L 53/00 701/521 |
| 2016/0061616 A1* | 3/2016 | Meyer | ................ | G01C 21/3469 701/123 |
| 2016/0076899 A1* | 3/2016 | Macneille | .......... | G08G 1/09685 701/428 |
| 2016/0153796 A1* | 6/2016 | Stankoulov | ........ | G01C 21/3469 701/123 |
| 2016/0258765 A1* | 9/2016 | Peterson | ............ | G01C 21/3469 |
| 2016/0258770 A1* | 9/2016 | Mason | ............. | G06Q 10/06311 |
| 2017/0030728 A1* | 2/2017 | Baglino | ................ | G01C 21/3469 |
| 2017/0082448 A1* | 3/2017 | Arita | ..................... | G01C 21/3667 |
| 2017/0232952 A1* | 8/2017 | Blasinski | .................. | B60K 6/48 701/22 |
| 2017/0307391 A1* | 10/2017 | Mason | ................... | G08G 1/202 |
| 2017/0370738 A1* | 12/2017 | Park | ..................... | G01C 21/3667 |
| 2018/0045527 A1* | 2/2018 | Baker | .................. | G01C 21/3484 |
| 2018/0143029 A1* | 5/2018 | Nikulin | ............... | G01C 21/3415 |

(56) References Cited

U.S. PATENT DOCUMENTS

| | | | |
|---|---|---|---|
| 2018/0209800 A1* | 7/2018 | Saito | G01C 21/34 |
| 2018/0216948 A1* | 8/2018 | Ba | G01C 21/343 |
| 2019/0113354 A1* | 4/2019 | Matsumura | G01C 21/3453 |
| 2019/0219417 A1* | 7/2019 | Quint | G01C 21/3632 |
| 2019/0265057 A1* | 8/2019 | Baglino | G01C 21/3469 |
| 2019/0283600 A1* | 9/2019 | Koebler | G08G 1/096775 |
| 2019/0383628 A1* | 12/2019 | Quint | G01C 21/3492 |
| 2019/0383637 A1* | 12/2019 | Teske | B60L 53/67 |
| 2020/0124431 A1* | 4/2020 | Heap | G05D 1/0217 |
| 2020/0124432 A1* | 4/2020 | Heap | G05D 1/0217 |
| 2021/0088347 A1* | 3/2021 | Matsumura | G05D 1/0217 |
| 2021/0389145 A1* | 12/2021 | Liu | B60L 3/12 |
| 2022/0412764 A1* | 12/2022 | Wu | G01C 21/3658 |
| 2023/0022823 A1* | 1/2023 | Hirano | G01C 21/3697 |
| 2023/0028206 A1* | 1/2023 | Quint | B60L 53/305 |
| 2023/0038012 A1* | 2/2023 | Erozlu | B60L 58/13 |
| 2023/0236032 A1* | 7/2023 | Matsumura | G01C 21/3664 701/25 |
| 2023/0406131 A1* | 12/2023 | Quint | B60L 1/00 |
| 2024/0011783 A1* | 1/2024 | Struhs | G01C 21/3415 |
| 2024/0085203 A1* | 3/2024 | Baglino | G01C 21/3469 |

FOREIGN PATENT DOCUMENTS

| | | | | |
|---|---|---|---|---|
| JP | 2012117961 A | * | 6/2012 | |
| KR | 20110061374 A | * | 12/2009 | |
| WO | WO-2013172157 A1 | * | 11/2013 | G01C 21/3469 |

* cited by examiner

HIGH-DEFINITION ENERGY CONSUMPTION MAP FOR VEHICLES

INTRODUCTION

In-vehicle user experience and control systems (e.g., in-vehicle infotainment (IVI) systems) may generally include computing systems that may provide entertainment and information monitoring and control to the driver or other passengers of a vehicle by way of one or more computing devices and associated displays included in the vehicle. For example, IVI systems may provide and display, for example, notifications, maps, entertainment media (e.g., music, photographs, movies, mobile applications), and user personal data (e.g., phone contacts, emails, multimedia messages) during operation of the vehicle. However, typical maps provided and displayed by IVI systems may often be limited to displaying only traffic data and navigation data.

BRIEF SUMMARY

Embodiments of the present disclosure are directed toward an in-vehicle control and display system (e.g., in-vehicle infotainment (IVI) system) for providing a high-definition energy consumption map for a vehicle. Indeed, in accordance with the presently disclosed embodiments, the in-vehicle control and display system may provide a high-definition energy consumption map (e.g., three-dimensional (3D) map including latitudinal data, longitudinal data, and predicted energy consumption data) that may dynamically display to the driver or the owner of the vehicle a predicted energy consumption of the vehicle along one or more trajectories of a planned drive path and/or along one or more trajectories of a deviated drive path (e.g., unplanned drive path that the driver or the owner of the vehicle determines and causes the vehicle to perform extemporaneously). Specifically, in certain embodiments, the high-definition energy consumption map may display a drive path as segmented into, for example, a number of trajectories and visually indicate a quantity of energy (e.g., battery charge or fuel) estimated to remain as the vehicles approaches each of a number of different points along the one or more trajectories. In this way, the high-definition energy consumption map may increase driver experience by allowing the driver or owner of the vehicle to expeditiously view and ascertain the charge level or fuel level of the vehicle at the different points along the one or more trajectories. This may ensure that the vehicle may not succumb to "low" battery charge or "low" fuel while traveling the deviated drive path, for example, during a sightseeing detour or similar adventure.

In certain embodiments, the computing system may display, on a display of a computing system of the vehicle, a map of an environment external to the vehicle, in which the map may include a predicted drive path extending between an initial location of the vehicle and a final destination of the vehicle within the environment. For example, in one embodiment, the map of the environment external to the vehicle may include a high-definition map. In certain embodiments, the computing system may then generate, based on the predicted drive path, a prediction of the energy consumption of the vehicle along the one or more trajectories of the predicted drive path. In certain embodiments, the computing system may display, on the display of the computing system, the predicted energy consumption of the vehicle along the one or more trajectories of the predicted drive path. In one embodiment, the predicted energy consumption of the vehicle may be displayed so as to at least partially overlay the predicted drive path.

In certain embodiments, the displayed high-definition map may include longitudinal location data, latitudinal location data, and the predicted energy consumption of the vehicle. In certain embodiments, prior to generating the prediction of the energy consumption of the vehicle, the computing system may receive a user input corresponding to a request to display the predicted energy consumption of the vehicle. In some embodiments, the computing system may generate the prediction of the energy consumption of the vehicle by generating the prediction of the energy consumption based on historical consumption data associated with one or more other vehicles and stored on a server accessible by the computing system. In other embodiments, the computing system may generate the prediction of the energy consumption of the vehicle by generating the prediction of the energy consumption based on vehicle data associated with the vehicle.

For example, in certain embodiments, the vehicle data may include one or more of a vehicle speed, a vehicle battery charge level, a vehicle battery charge rate, a vehicle acceleration, a vehicle fuel range, a vehicle fuel level, a historical energy consumption of the vehicle, or a vehicle maintenance schedule. In certain embodiments, the computing system may generate, based on the predicted drive path, a prediction of the energy consumption of the vehicle along the one or more trajectories of the predicted drive path, at the initial location, and at the final destination. In certain embodiments, the computing system may then display, on the display of the computing system, the prediction of the energy consumption of the vehicle along the one or more trajectories of the predicted drive path, at the initial location, and at the final destination.

In certain embodiments, prior to displaying the predicted energy consumption of the vehicle, the computing system may update the map based on the predicted energy consumption of the vehicle along the one or more trajectories of the predicted drive path. For example, in one embodiment, the computing system may display the predicted energy consumption of the vehicle by displaying the updated map. In one embodiment, the computing system may then provide the updated map may to a transportation management system (TMS) remote from the vehicle. In certain embodiments, the computing system may display the predicted energy consumption of the vehicle by populating a number of visual indicators corresponding to the predicted energy consumption of the vehicle along the one or more trajectories.

For example, in one embodiment, populating the plurality of visual indicators corresponding to the predicted energy consumption of the vehicle may include populating the number of visual indicators at one or more points of interest on the predicted drive path. For example, in one embodiment, wherein at least one of the one or more points of interests may include a charging station or a fueling station. In certain embodiments, the predicted drive path may include a first predicted drive path. In certain embodiments, the computing systems may detect one or more inputs corresponding at least in part to a deviation of the vehicle from the first predicted drive path. In certain embodiments, the computing system may then generate a second predicted drive path based on the one or more inputs. For example, in one embodiment, the second predicted drive path may extend between a current location of the vehicle and the final destination of the vehicle.

In certain embodiments, the predicted energy consumption of the vehicle may include a first predicted energy consumption. In certain embodiments, the computing system may generate, based on the second predicted drive path and the first predicted energy consumption, a second prediction of the energy consumption of the vehicle along one or more trajectories of the second predicted drive path. In certain embodiments, the computing system may then display, on the display of the computing system, the second predicted energy consumption of the vehicle along the one or more trajectories of the second predicted drive path. For example, in one embodiment, the second predicted energy consumption of the vehicle may be displayed so as to at least partially overlay the second predicted drive path. In certain embodiments, the vehicle may include at least one of an electric vehicle (EV), a battery electric vehicle (BEV), a hybrid electric vehicle (HEV), or a plug-in hybrid electric vehicle (PHEV).

The embodiments disclosed above are only examples, and the scope of this disclosure is not limited to them. Certain embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Embodiments of the present disclosure are directed toward an in-vehicle control and display system (e.g., in-vehicle infotainment (IVI) system) for providing a high-definition energy consumption map for a vehicle. Indeed, in accordance with the presently disclosed embodiments, the in-vehicle control and display system may provide a high-definition energy consumption map (e.g., three-dimensional (3D) map including latitudinal data, longitudinal data, and predicted energy consumption data) that may dynamically display to the driver or the owner of the vehicle a predicted energy consumption of the vehicle along one or more trajectories of a planned drive path and/or along one or more trajectories of a deviated drive path (e.g., unplanned drive path that the driver or the owner of the vehicle determines and causes the vehicle to perform extemporaneously). Specifically, in certain embodiments, the high-definition energy consumption map may display a drive path as segmented into, for example, a number of trajectories and visually indicate a quantity of energy (e.g., battery charge or fuel) estimated to remain as the vehicles approaches each of a number of different points along the one or more trajectories. In this way, the high-definition energy consumption map may increase driver experience by allowing the driver or owner of the vehicle to expeditiously view and ascertain the charge level or fuel level of the vehicle at the different points along the one or more trajectories. This may ensure that the vehicle may not succumb to "low" battery charge or "low" fuel while traveling the deviated drive path, for example, during a sightseeing detour or similar adventure.

Figure 1:
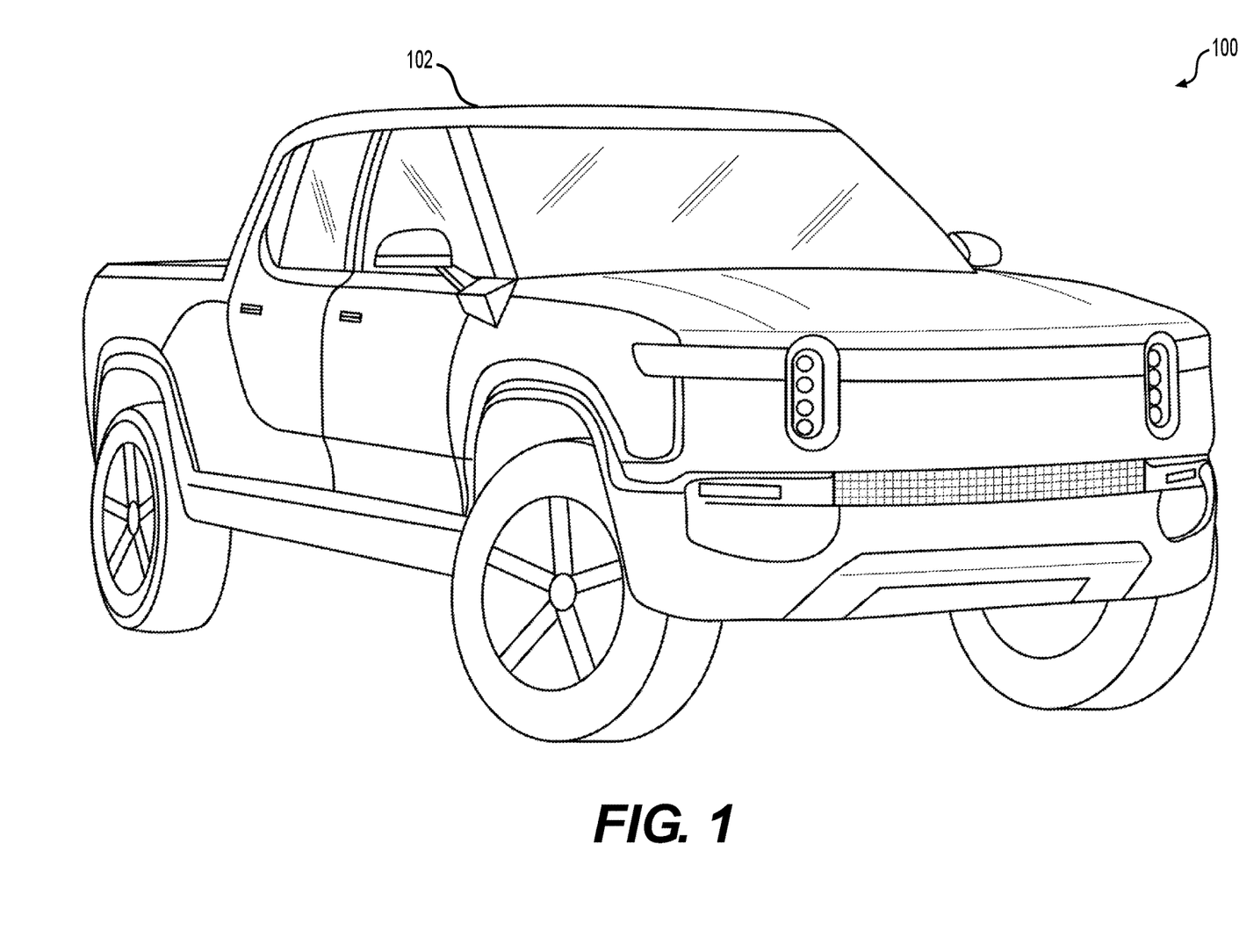
FIG. 1 illustrates an example embodiment of a vehicle environment including a vehicle.

FIG. 1 illustrates an example embodiment of a vehicle environment 100 including a vehicle 102, in accordance with the presently disclosed embodiments. As depicted, the vehicle 102 may include any passenger vehicle (e.g., a car, a truck, a pickup truck, a sports utility vehicle (SUV), a minivan, a crossover utility vehicle (CUV), a cargo van, a towing truck) that may be utilized for transportation and to navigate one or more rural environments, urban environments, and/or off-roading and mountainous environments. In some embodiments, the vehicle 102 may include a gasoline-powered vehicle that may be propelled, for example, by an internal combustion engine (ICE) or other fuel-injection engine. In other embodiments, the vehicle 102 may include, for example, an electric vehicle (EV), a battery electric vehicle (BEV), a hybrid electric vehicle (HEV), a plug-in hybrid electric vehicle (PHEV), or other vehicle 102 that may be in part or wholly propelled by one or more electric motors (e.g., synchronous electric motors, permanent magnet synchronous electric motors (PMSMs), induction motors (IMs), line start synchronous motors (LSSMs), line start permanent magnet motors (LSPMMs), synchronous reluctance motors (SynRMs)) utilizing power stored to one or more batteries included in the vehicle 102.

In some embodiments, the vehicle 102 may include an autonomous or semi-autonomous vehicle suitable for operating, for example, in accordance with Level-1 autonomous driving, Level-2 autonomous driving, Level-3 autonomous driving, Level-4 autonomous driving, Level-5 autonomous driving, or switching between the different levels of autonomous driving functionality. Further, while the present embodiments may be discussed primarily with respect to the example embodiment of a personal passenger vehicle 102, it should be appreciated that, in other embodiments, the vehicle 102 may be one of a fleet of similar vehicles 102 (e.g., a fleet of delivery vans, a fleet of semi-trailer trucks, a fleet of police vehicles, a fleet of taxis, or a fleet of food-service vehicles).

Figure 2:
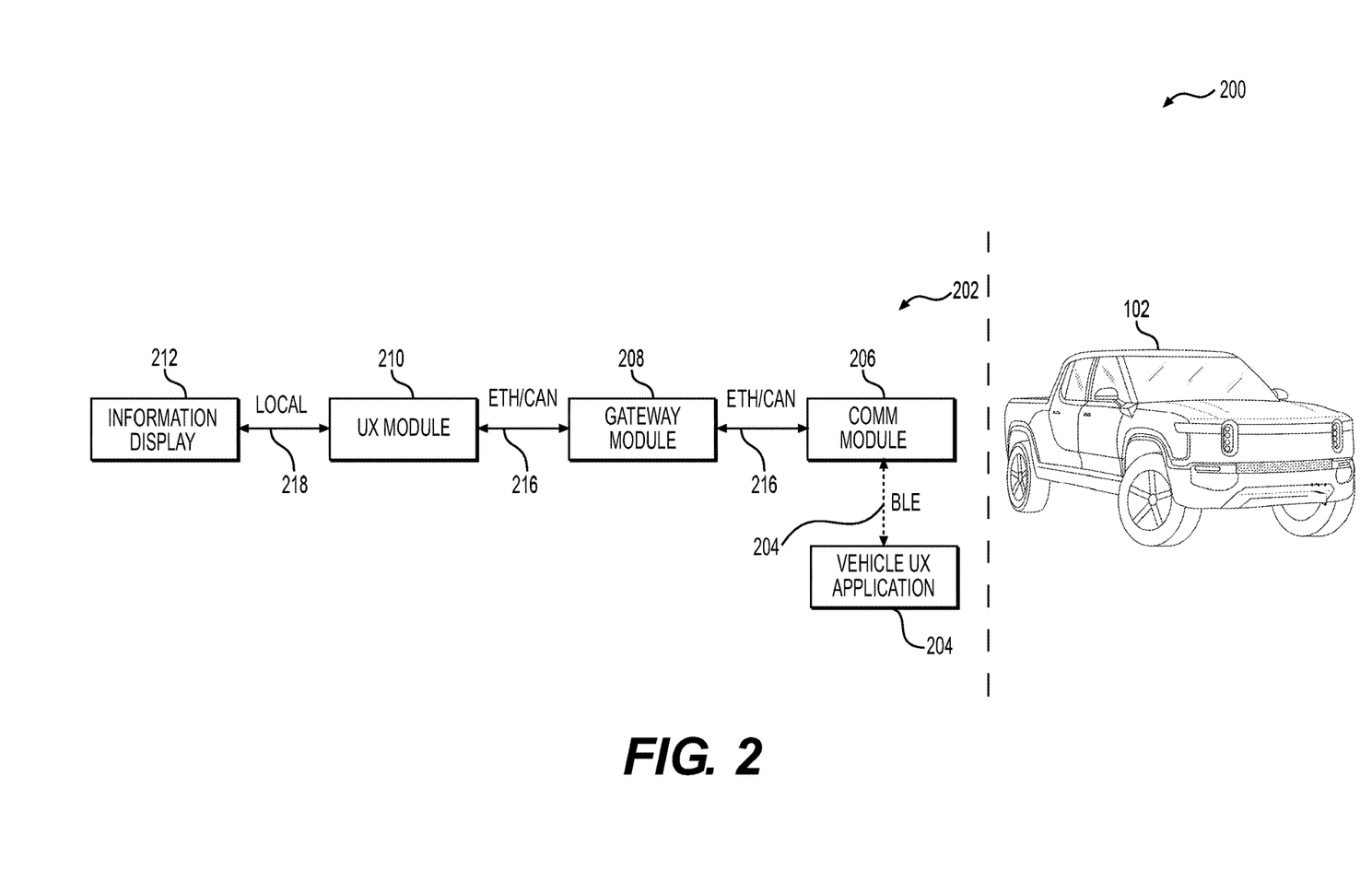
FIG. 2 illustrates an example embodiment of an in-vehicle control system for providing a high-definition energy consumption map for a vehicle.

FIG. 2 illustrates an example embodiment of an in-vehicle infotainment (IVI) system of a vehicle 102, in accordance with the presently disclosed embodiments. For example, as depicted by FIG. 2, the vehicle 102 may include an in-vehicle infotainment (IVI) system 202. In certain embodiments, the IVI system 202 may include any in-vehicle computing and display system that may be suitable for providing entertainment and information monitoring and control features to a driver or one or more passengers of the vehicle 102. For example, in some embodiments, the IVI system 202 may include some combination of software, hardware, and middleware that may be suitable for allowing the driver or one or more passengers of the vehicle 102, for example, to stream media content (e.g., audio data, video data, image data, call log data, navigational maps, vehicle data, driver(s) profile data, weather data), enable the use of voice-based and touch-based control of various components and applications (e.g., vehicle 102 driving mode; camera angle and adjustments; mirror angle and adjustments; seating adjustments; vehicle 102 external and internal lighting adjustments; powering the vehicle 102 "ON" or "OFF", locking and unlocking the vehicle 102; windowing opening and closing; trunk, hatch, or tailgate opening and closing; requesting updates from the vehicle 102; pairing with one or more personal electronic devices of the driver or other passengers of the vehicle 102; creating and modifying one or more driver profiles; controlling and managing the settings and functionality of one or more components of the vehicle 102) on the vehicle 102, and for allowing the vehicle to send and receive over-the-air (OTA) information between the vehicle 102 and one or more external devices (e.g., between vehicle 102 and one or more remote servers, between the vehicle 102 and one or more other vehicles, between the vehicle 102 and the one or more vehicle accessories).

As further depicted, in certain embodiments, the IVI system 202 may include a vehicle user experience ("UX") application 204, a telecommunications module 206, a gateway module 208, a user experience ("UX") module 210, and an information monitoring and control display 212. In certain embodiments, the vehicle UX application 204 may be coupled to the telecommunications module 206 utilizing one or more short-range wireless communication networks 214 (e.g., Bluetooth®, Bluetooth® Low Energy (BLE), IPv6 over Low-Power Wireless Personal Area Networks (6LoW-PAN), near-field communication (NFC), or other short-range vehicle area network (VAN)). In certain embodiments, the telecommunications module 206 may include a telematics control unit (TCU) that may be utilized, for example, to control wireless tracking, diagnostics, and communication of the vehicle 102 and/or between the vehicle 102 and one or more other components of the vehicle 102 or a remote server associated with the vehicle 102.

In certain embodiments, one or more signals may be passed between the telecommunications module 206 and the gateway module 208 via an Ethernet connection (e.g., Automotive Ethernet), a car area network (CAN), or other high-speed data network 216 that may be included as part of the IVI system 202. In certain embodiments, the gateway module 208 may include any controller or processor-based device that may be suitable for interconnecting and securely transferring data across the various network connections 214, 216, 218 included as part of the IVI system 202. For example, in certain embodiments, one or more signals may be passed between the vehicle UX application 204, the telecommunications module 206, and the gateway module 208 and UX module 210 to cause the information monitoring and control display 212 (e.g., touch-sensitive display) to display a high-definition energy consumption map in accordance with the presently disclosed embodiments. For example, as will be further appreciated with respect to FIGS. 3A and 3B below, in some embodiments, the IVI system 202 cause the information monitoring and control display 212 (e.g., touch-sensitive display) to display a high-definition energy consumption map (e.g., 3D map including latitudinal data, longitudinal data, and predicted energy consumption data) that may display (e.g., in real-time or near real-time) to the driver or the owner of the vehicle 102 the predicted energy consumption of the vehicle 102 along one or more trajectories of a current or future intended drive path of the vehicle 102.

Figure 3A:
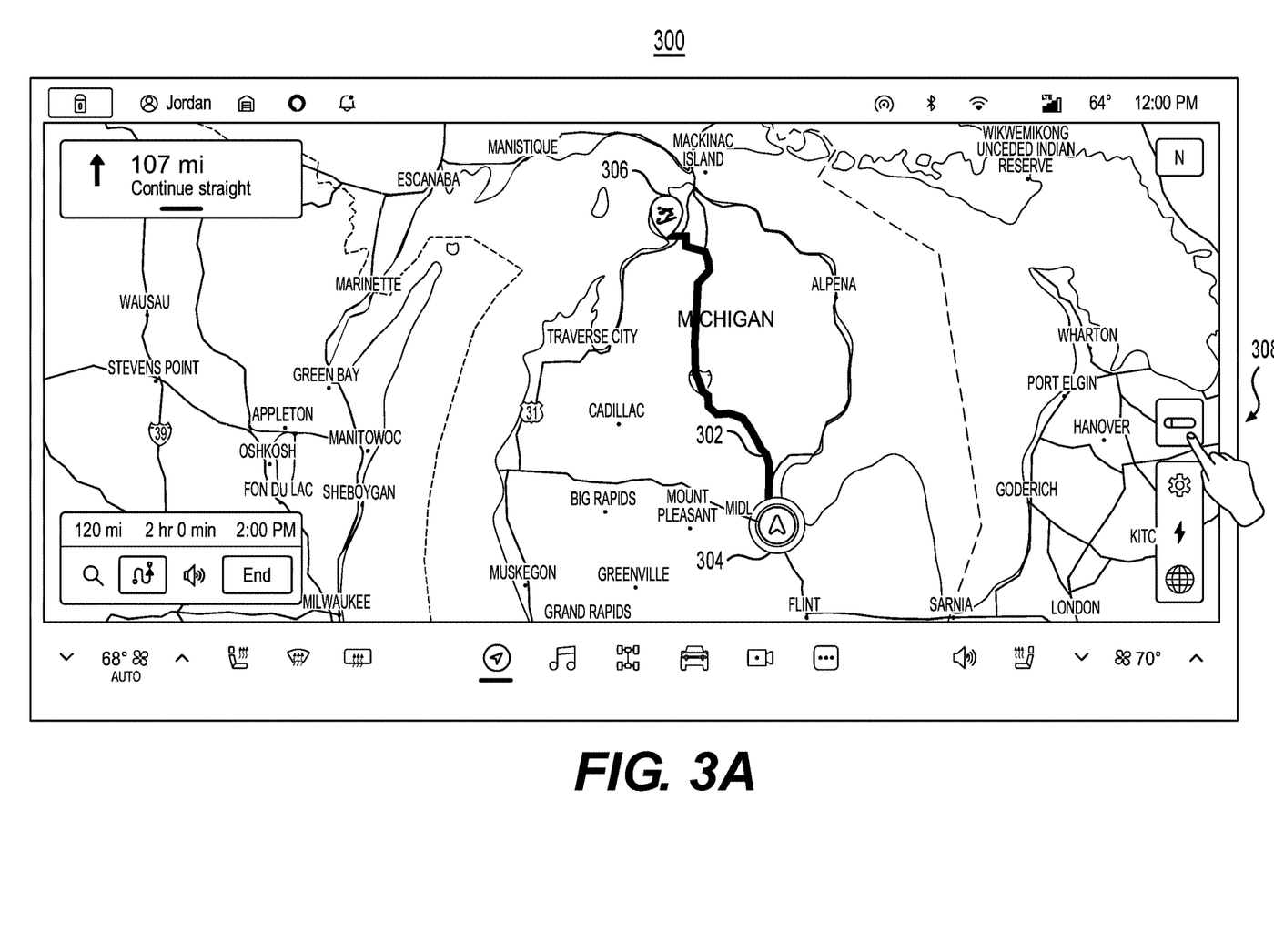
FIGS. 3A-3B illustrates example user interfaces for displaying a high-definition energy consumption map for a vehicle.

FIGS. 3A-3B illustrates example user interfaces for displaying a high-definition energy consumption map for a vehicle, in accordance with the presently disclosed embodiments. For example, in one embodiment, the user interface 300 may include, for example, a user interface that may be generated by the IVI system 202 and displayed on the information monitoring and control display 212 of the vehicle 102. As depicted by FIG. 3A, a map of an environment (e.g., one or more rural environments, urban environments, and/or off-roading and mountainous environments) in which the vehicle 102 is operating may be displayed on the information monitoring and control display 212. For example, in some embodiments, the displayed map may include a predicted drive path 302 (e.g., corresponding to a planned or preplanned drive path the driver or owner of the vehicle 102 intends to travel) extending between an initial location 304 of the vehicle 102 and a final destination 306 of the vehicle 102, for example, that may be displayed in response to the user or driver of the vehicle 102 inputting a destination.

Figure 3B:
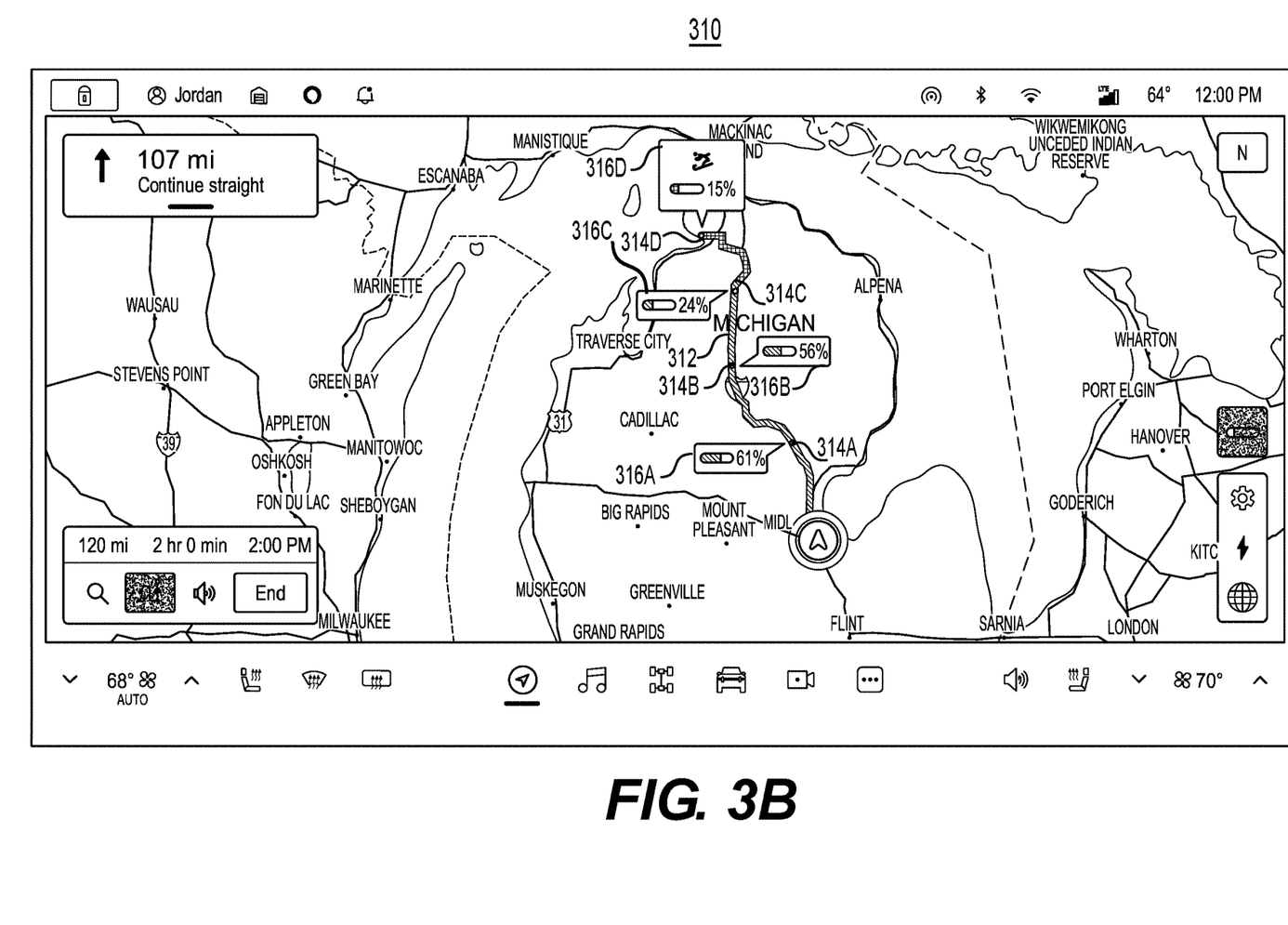

In certain embodiments, the user or driver of the vehicle may then select one or more affordances 308 displayed on the information monitoring and control display 212 corresponding to a request to display a predicted energy consumption of the vehicle 102. In other embodiments, the predicted energy consumption of the vehicle 102 may be automatically displayed on the information monitoring and control display 212 as the vehicle 102 begins proceeding along the predicted drive path 302. In certain embodiments, in response to receiving the user selection of the one or more affordances 308 or in response to the vehicle 102 proceeding along the predicted drive path 302, a user interface 310 may be then generated and displayed on the information monitoring and control display 212. For example, as depicted by FIG. 3B, based on the predicted drive path 302, a prediction of the energy consumption 312 of the vehicle 102 along a number of trajectories 314A, 314B, 314C, and 314D of the predicted drive path 302.

In certain embodiments, the number of trajectories 314A, 314B, 314C, and 314D of the predicted drive path 302 may be defined or characterized, for example, by a physical length, a time, or a state of charge or state of fuel. For example, physical length of the number of trajectories 314A, 314B, 314C, and 314D may refer to a fixed number of segments (e.g., 1, 2, 3, 4, or N segments), in which each segment has the same physical length (e.g., 1/N the physical distance of the predicted drive path 302). In one embodiment, based on the jurisdictional speed limit in which the vehicle 102 may be traveling, one or more of the segments may have slightly different travel times. Similarly, time of the number of trajectories 314A, 314B, 314C, and 314D may refer to a fixed number of segments (e.g., 1, 2, 3, 4, 5, or N segments), in which each segment has the same travel time (e.g., 1/N the travel time of the predicted drive path 302). In one embodiment, based on the jurisdictional speed limit in which the vehicle 102 may be traveling, one or more of the segments may have slightly different lengths. State of charge or state of fuel of the number of trajectories 314A, 314B, 314C, and 314D may refer to the battery charge level or fuel level of the vehicle 102 at the end points of the respective trajectories 314A, 314B, 314C, and 314D. For example, in some embodiments, for a predicted drive path 302 including a total of 3 predicted trajectories, the first trajectory 314A may end at a location in which the battery has 50% charge, the second trajectory may end at a location in which the battery has 25% charge, and the third trajectory may end at the destination in which the battery has N % charge (e.g., where N>0%).

For example, in certain embodiments, the number of trajectories 314A, 314B, 314C, and 314D of the predicted drive path 302 may correspond, for example, to one or more points of interest (e.g., a mile marker, a charging station, a fueling station, a restaurant, a resting area, a coffee house, vehicle 102 starting point, vehicle 102 final destination, and so forth) along the predicted drive path 302. In certain embodiments, as depicted by the user interface of FIG. 3B, the prediction of the energy consumption 312 may be displayed as overlaying the predicted drive path 302. For example, in some embodiments, the prediction of the energy consumption 312 may displayed, for example, in varying colors along the predicted drive path 302 in accordance with battery charge level (e.g., "green" indicating "sufficient" charge and corresponding to physical locations along the drive path and within the environment for which charge is estimated to be "sufficient"; "yellow" indicating "medium" charge and corresponding to physical locations along the drive path and within the environment for which charge is estimated to be "medium"; "red" indicating "low" charge and corresponding to physical locations along the drive path and within the environment for which charge is estimated to be "low").

In some embodiments, the IVI system 202 may generate the prediction of the energy consumption 312 based on historical consumption data associated with the vehicle 102 or associated with one or more other vehicles that may be stored on a server of a transportation management system (TMS) communicatively coupled to the vehicle 102. For example, in one embodiment, the vehicle 102 may continuously or sporadically exchange map updates with the TMS. In other embodiments, the IVI system 202 may generate the prediction of the energy consumption 312 based on vehicle 102 data associated with the vehicle 102. For example, in certain embodiments, the vehicle data may include one or more of a vehicle 102 speed, a vehicle 102 battery charge level, a vehicle 102 battery charge rate, a vehicle 102 acceleration, a vehicle 102 fuel range, a vehicle 102 fuel level, a historical energy consumption of the vehicle 102, a vehicle 102 maintenance schedule, or other vehicle 102 data that may be used to accurately estimate the prediction of the energy consumption 312 of the vehicle 102 along a number of trajectories 314A, 314B, 314C, and 314D of the predicted drive path 302.

In certain embodiments, the IVI system 202 may display the predicted energy consumption 312 of the vehicle 102 by populating a number of visual indicators 316A, 316B, 316C, and 316D (e.g., a numerical value indicating charge level or fuel level, a battery icon indicating charge level, a gas pump icon indicating fuel level, or other similar visual element) corresponding to the predicted energy consumption 312 along the number of trajectories 314A, 314B, 314C, and 314D. For example, in one embodiment, the number of visual indicators 316A, 316B, 316C, and 316D may be populated at one or more points of interest (e.g., a mile marker, a charging station, a fueling station, a restaurant, a resting area, a coffee house, vehicle 102 starting point, vehicle 102 final destination, and so forth) along the predicted drive path 302.

In certain embodiments, the IVI system 202 may detect one or more inputs indicating that the vehicle 102, for example, is deviating from the predicted drive path 302. For example, in one embodiment, the driver or owner of the vehicle 102 may input an updated final destination as indication that the driver or the owner of the vehicle 12 intends to deviate from the predicted drive path 302. In another embodiment, the driver or the owner vehicle 102 may cause the vehicle 102 to temporarily deviate from the predicted drive path 302, for example, as part of a sightseeing detour or similar adventure. In certain embodiments, the IVI system 202 may then generate a deviated drive path (e.g., corresponding to an unplanned drive path that the driver or the owner of the vehicle 102 determines and causes the vehicle to perform extemporaneously) based on the deviation of the vehicle 102. For example, in one embodiment, the deviated drive path may extend between a current location of the vehicle 102 and the final destination of the vehicle 102 determined with respect to the predicted drive path 302. In another embodiment, the deviated drive path may be independent of the predicted drive path 302.

In certain embodiments, the IVI system 202 may then generate a second prediction of the energy consumption of the vehicle 102 along one or more trajectories of the deviated drive path based on the deviated drive path and the previous predicted energy consumption 312. In certain embodiments, the IVI system 202 may then display the second predicted energy consumption of the vehicle 102 along the one or more trajectories of the deviated drive path. Specifically, by automatically generating an updated prediction of the energy consumption of the vehicle based on, for example, the deviated drive path and the previous predicted energy consumption 312, the IVI system 202 may increase driver experience by allowing the driver or owner of the vehicle 102 to expeditiously view and ascertain the charge level or fuel level of the vehicle 102 at different points along the one or more trajectories of the deviated drive path. This ensures that the vehicle 102 may not succumb to "low" battery charge or "low" fuel while traveling the deviated drive path, for example, during a sightseeing detour or similar adventure.

Indeed, in accordance with the presently disclosed embodiments, the IVI system 202 may provide a high-definition energy consumption map (e.g., 3D map including latitudinal data, longitudinal data, and predicted energy consumption data) that may dynamically display to the driver or the owner of the vehicle 102 a predicted energy consumption of the vehicle 102 along one or more trajectories of a planned drive path and/or along one or more trajectories of a deviated drive path (e.g., unplanned drive path that the driver or the owner of the vehicle 102 determines and causes the vehicle 102 to perform extemporaneously). Specifically, in accordance with the presently disclosed embodiments, the high-definition energy consumption map may display a drive path as segmented into, for example, a number of trajectories and visually indicate a quantity of energy (e.g., battery charge or fuel) estimated to remain as the vehicle 102 approaches each of a number of different points along the one or more trajectories. In this way, the high-definition energy consumption map may increase driver experience by allowing the driver or owner of the vehicle 102 to expeditiously view and ascertain the charge level or fuel level of the vehicle 102 at the different points along the one or more trajectories. As previously noted, this may ensure that the vehicle 102 may not succumb to "low" battery charge or "low" fuel while traveling the deviated drive path, for example, during a sightseeing detour or similar adventure.

Figure 4:
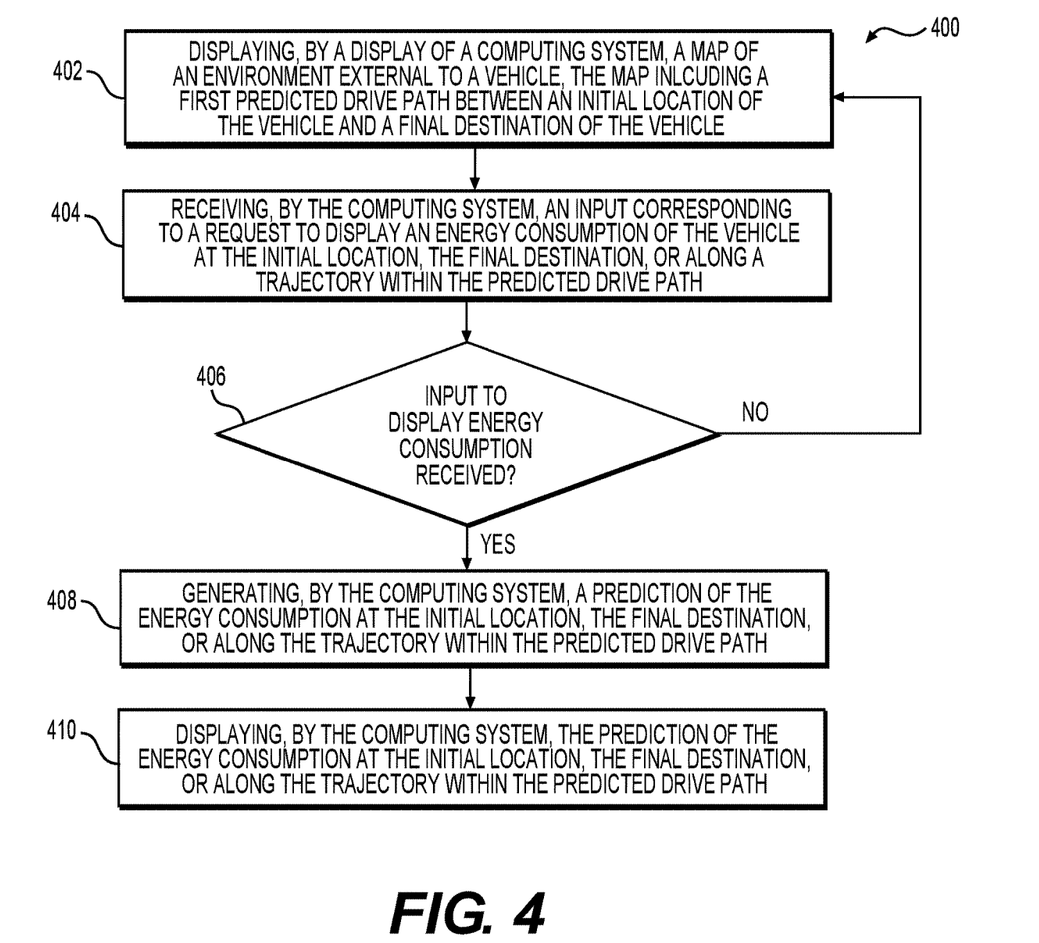
FIG. 4 illustrates a flow diagram of a method for providing a high-definition energy consumption map for a vehicle.

FIG. 4 illustrates a flow diagram of a method 400 for providing a high-definition energy consumption map for a vehicle, in accordance with the presently disclosed embodiments. The method 400 may be performed utilizing one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), or any other processing device(s) that may be suitable for processing various vehicle data and making one or more decisions based thereon), software (e.g., instructions running/executing on one or more processors), firmware (e.g., microcode), or some combination thereof.

The method 400 may begin at block 402 with one or more processing devices displaying, on a display of a computing system of the vehicle, a map of an environment external to the vehicle, in which the map includes a predicted drive path extending between an initial location of the vehicle and a final destination of the vehicle within the environment. For example, in one embodiment, the map of the environment external to the vehicle may include a high-definition map. The method 400 may continue at block 404 with one or more processing devices receiving, by the computing system, a user input corresponding to a request to display a predicted energy consumption of the vehicle. For example, in one embodiment, the driver or owner of the vehicle may select one or more affordances displayed on the information display 212 corresponding to a request to display a predicted energy consumption of the vehicle 102.

The method 400 may then continue at decision 406 with one or more processing devices determining, by the computing system, whether the user input has been received. For example, in some embodiments, a predicted energy consumption of the vehicle may be automatically displayed by the information display 212 in response to the driver or owner of the vehicle 102 inputting a desired destination. In other embodiments, the information display 212 may display a predicted energy consumption of the vehicle 102 in response to receiving a particular input by the driver or owner of the vehicle 102. In some embodiments, in response to determining, by the computing system, that the user input has not been received, the method 400 may return to block 402.

In other embodiments, in response to determining, by the computing system, that the user input has been received, the method 400 may then continue at block 408 with one or more processing devices generating, by the computing system, and based on the predicted drive path, a prediction of the energy consumption of the vehicle along the one or more trajectories of the predicted drive path. For example, in one embodiment, the prediction of the energy consumption may be generated based on historical consumption data associated with one or more other vehicles and stored on a server accessible by the computing system of the vehicle 102. In another embodiment, the prediction of the energy consumption may be generated based on vehicle data associated with the vehicle 102.

The method 400 may then continue at block 410 with one or more processing devices displaying, on the display of the computing system, the predicted energy consumption of the vehicle along the one or more trajectories of the predicted drive path, in which the predicted energy consumption of the vehicle is displayed so as to at least partially overlay the predicted drive path. For example, in some embodiments, the prediction of the energy consumption of the vehicle may be displayed along the one or more trajectories of the predicted drive path, at the initial location of the vehicle 102, and at the final destination of the vehicle 102 and/or at one or more points of interests along the predicted drive path.

Figure 5:
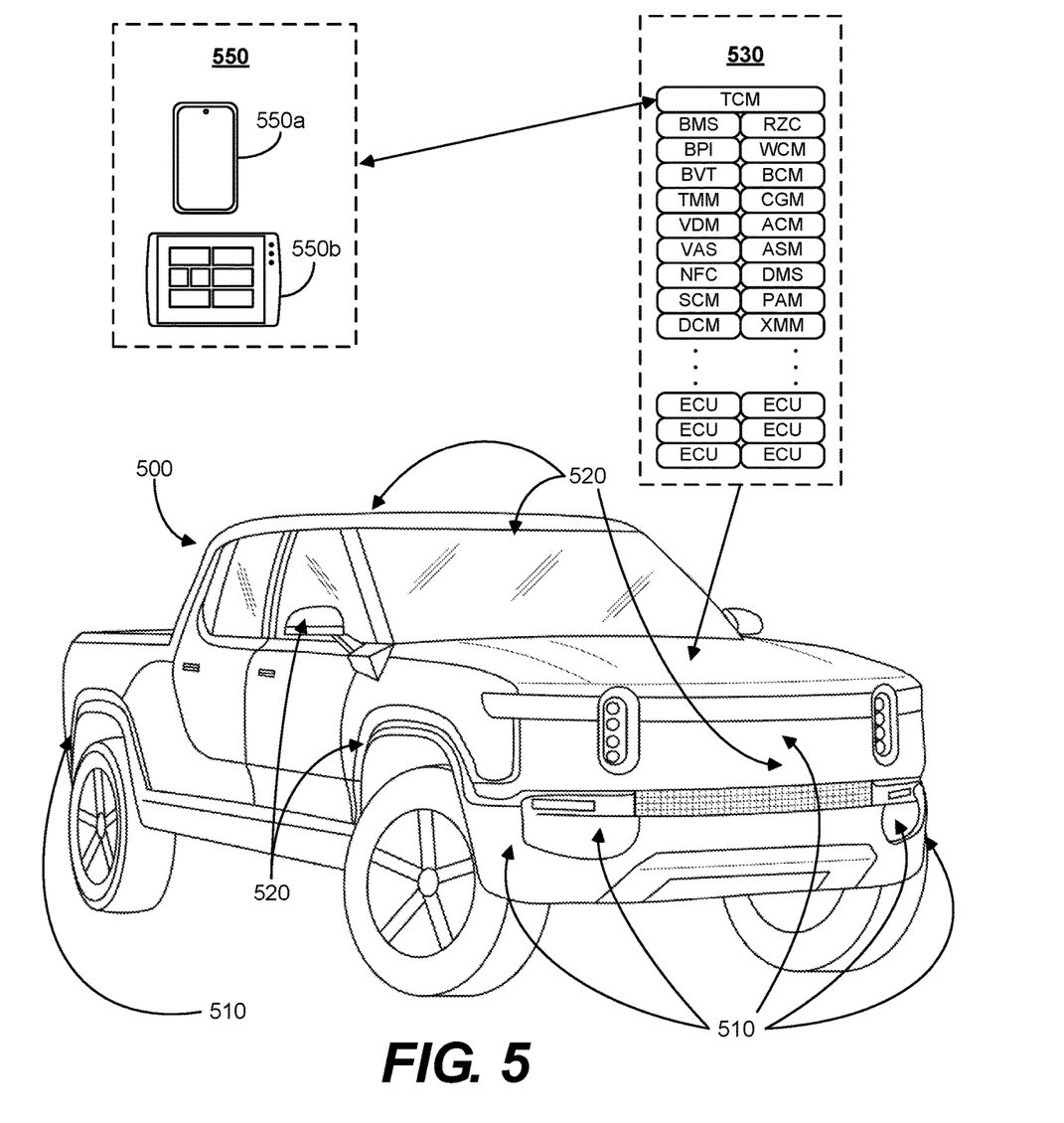
FIG. 5 illustrates an example vehicle.

FIG. 5 illustrates an example vehicle 500. Vehicle 500 may include multiple sensors 510, multiple cameras 520, and a control system 530. In some embodiments, vehicle 500 may be able to pair with a computing device 550 (e.g., smartphone 550a, tablet computing device 550b, or a smart vehicle accessory). As an example and not by way of limitation, a sensor 510 may be an accelerometer, a gyroscope, a magnetometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof.

As an example and not by way of limitation, a camera 520 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 500 may include various controllable components (e.g., doors, seats, windows, lights, HVAC, entertainment system, security system), instrument and information displays and/or interactive interfaces, functionality to pair a computing device 550 with the vehicle (which may enable control of certain vehicle functions using the computing device 550), and functionality to pair accessories with the vehicle, which may then be controllable through an interactive interface in the vehicle or through a paired computing device 550.

Figure 6A:
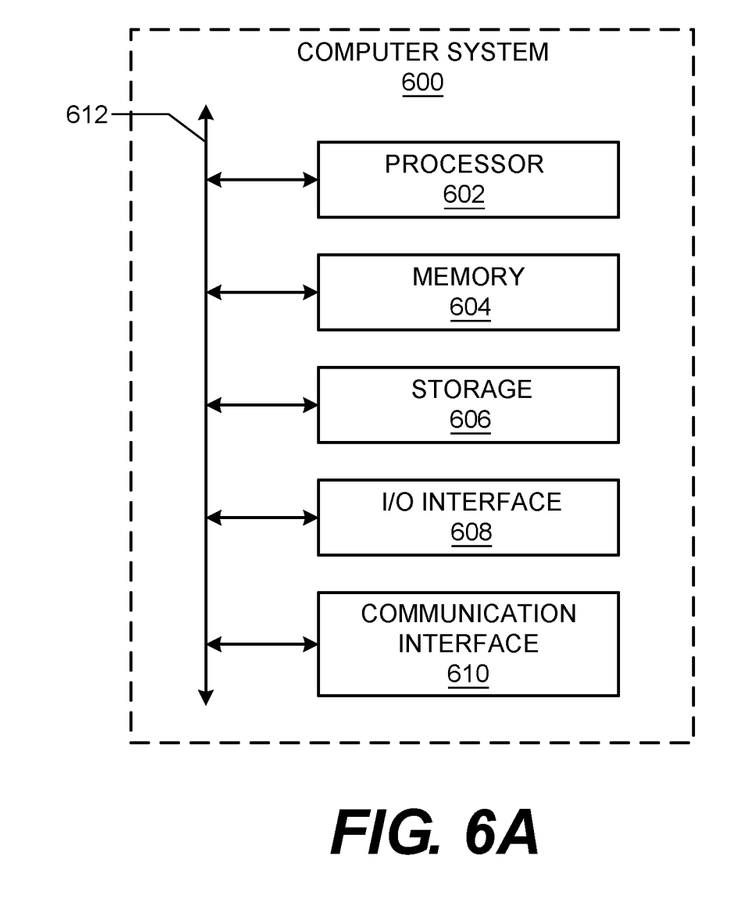
FIG. 6A is a schematic of an example computer system.

Control system 530 may enables control of various systems on-board the vehicle. As shown in FIG. 5, control system 530 may comprise one or more electronic control units (ECUs), each of which are dedicated to a specific set of functions. Each ECU may be a computer system (as described further in FIG. 6), and each ECU may include functionality provide by one or more of the example ECUs described below.

Features of embodiments as described herein may be controlled by one or more ECUs that provide functionality to control access to the vehicle. A Vehicle Access System (VAS) ECU may provide passive/active wireless sensors (e.g., Bluetooth) authorizing accessing (i.e., locking or unlocking) the vehicle. A Near-Field Communication (NFC) ECU may support an NFC reader embedded in the vehicle (e.g., in the driver-side exterior door handle or in the armrest of the interior, driver-side door panel) for user authentication.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 550, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by a Body Control Module (BCM) ECU. The BCM ECU may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s).

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 530. In some embodiments, functions of the ACM and the XMM may be combined together into an Autonomous eXperience Module (AXM) ECU.

Vehicle 500 may include one or more additional ECUs, such as, by way of example and not limitation: a Central Gateway Module (CGM) ECU, a Telematics Control Module (TCM) ECU, a Vehicle Dynamics Module (VDM) ECU, an Experience Management Module (XMM) ECU, a Vehicle Access System (VAS) ECU, a Near-Field Communication (NFC) ECU, and/or a Body Control Module (BCM) ECU.

FIG. 6A illustrates an example computer system 600. Computer system 600 may include a processor 602, memory 604, storage 606, an input/output (I/O) interface 608, a communication interface 610, and a bus 612. Although this disclosure describes one example computer system including specified components in a particular arrangement, this disclosure contemplates any suitable computer system with any suitable number of any suitable components in any suitable arrangement. As an example and not by way of limitation, computer system 600 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 600 may include one or more computer systems 600; be unitary or distributed, span multiple locations, machines, or data centers; or reside in a cloud, which may include one or more cloud components in one or more networks. Where appropriate, computer system(s) 600 may perform, at different times or at different locations, in real time or in batch mode, one or more steps of one or more methods described or illustrated herein.

Processor 602 may include hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. Processor 602 may include one or more internal caches for data, instructions, or addresses.

In certain embodiments, memory 604 includes main memory for storing instructions for processor 602 to execute or data for processor 602 to operate on. In certain embodiments, one or more memory management units (MMUs) reside between processor 602 and memory 604 and facilitate accesses to memory 604 requested by processor 602. In certain embodiments, memory 604 includes random access memory (RAM). This disclosure contemplates any suitable RAM.

In certain embodiments, storage 606 includes mass storage for data or instructions. As an example and not by way of limitation, storage 606 may include a removable disk drive, flash memory, an optical disc, a magneto-optical disc, magnetic tape, or a Universal Serial Bus (USB) drive or two or more of these. Storage 606 may include removable or fixed media and may be internal or external to computer system 600. Storage 606 may include any suitable form of non-volatile, solid-state memory or read-only memory (ROM).

In certain embodiments, I/O interface 608 includes hardware, software, or both, providing one or more interfaces for communication between computer system 600 and one or more input and/or output (I/O) devices. Computer system 600 may be communicably connected to one or more of these I/O devices, which may be incorporated into, plugged into, paired with, or otherwise communicably connected to vehicle 500 (e.g., through the TCM ECU). An input device may include any suitable device for converting volitional user input into digital signals that can be processed by computer system 600, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 510 described above. An output device may include devices designed to receive digital signals from computer system 600 and convert them to an output format, such as, by way of example and not limitation, speakers, headphones, a display screen, a headsup display, a lamp, a smart vehicle accessory, another suitable output device, or a combination thereof. This disclosure contemplates any suitable I/O devices and any suitable I/O interfaces 608 for them. I/O interface 608 may include one or more I/O interfaces 608, where appropriate.

In certain embodiments, communication interface 610 includes hardware, software, or both providing one or more interfaces for data communication between computer system 600 and one or more other computer systems 600 or one or more networks. Communication interface 610 may include one or more interfaces to a controller area network (CAN) or to a local interconnect network (LIN). Communication interface 610 may include one or more of a serial peripheral interface (SPI) or an isolated serial peripheral interface (isoSPI). In some embodiments, communication interface 610 may include a network interface controller (NIC) or network adapter for communicating with an Ethernet or other wire-based network or a wireless NIC (WNIC) or wireless adapter for communicating with a wireless network, such as a WI-FI network or a cellular network.

In certain embodiments, bus 612 includes hardware, software, or both coupling components of computer system 600 to each other. Bus 612 may include any suitable bus, as well as one or more buses 612, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

Figure 6B:
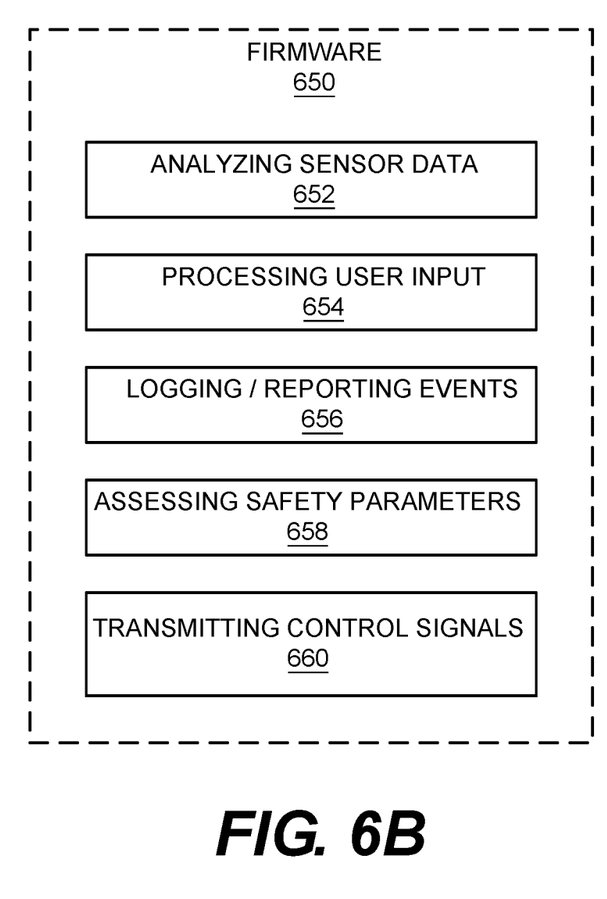
FIG. 6B illustrates example firmware for a vehicle ECU.

FIG. 6B illustrates example firmware 650 for a vehicle ECU 600 as described with respect to control system 530. Firmware 650 may include functions 652 for analyzing sensor data based on signals received from sensors 510 or cameras 520 received through communication interface 610. Firmware 650 may include functions 654 for processing user input (e.g., directly provided by a driver of or passenger in vehicle 500, or provided through a computing device 550) received through I/O interface 608. Firmware 650 may include functions 656 for logging detected events (which may be stored in storage 606 or uploaded to the cloud), as well as functions for reporting detected events (e.g., to a driver or passenger of the vehicle through an instrument display or interactive interface of the vehicle, or to a vehicle manufacturer, service provider, or third party through communication interface 610). Firmware 650 may include functions 658 for assessing safety parameters (e.g., monitoring the temperature of a vehicle battery or the distance between vehicle 500 and nearby vehicles). Firmware 650 may include functions 660 for transmitting control signals to components of vehicle 500, including other vehicle ECUs 600.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

What is claimed is:

1. A method for providing an energy consumption map for a vehicle, comprising:
   displaying, on a display of a computing system of the vehicle, a map of an environment external to the vehicle, the map including a predicted drive path extending between an initial location of the vehicle and a final destination of the vehicle within the environment;
   receiving, from a remote server and via a wireless communication network, historical consumption data associated with one or more other vehicles;
   receiving, from the vehicle, a battery charge level of the vehicle;
   generating, by the computing system, and based at least in part on the predicted drive path, the battery charge level, and the historical consumption data, a predicted energy consumption of the vehicle along one or more trajectories of the predicted drive path; and
   displaying, on the display of the computing system, the predicted energy consumption of the vehicle along the one or more trajectories of the predicted drive path, the predicted energy consumption comprising a remaining battery charge of the vehicle at each of a plurality of different points along the one or more trajectories between the initial location and the final destination of the predicted drive path, wherein the plurality of different points define a plurality of segments along the predicted drive path, each segment included in the plurality of segments having the same physical length or the same travel time, and the predicted energy consumption of the vehicle being displayed so as to at least partially overlay the predicted drive path.

2. The method of claim 1, wherein the map comprises longitudinal location data, latitudinal location data, and the predicted energy consumption of the vehicle.

3. The method of claim 1, further comprising:
   prior to generating the predicted energy consumption of the vehicle, receiving, by the computing system, a user input corresponding to a request to display the predicted energy consumption of the vehicle.

4. The method of claim 1, wherein generating the predicted energy consumption of the vehicle comprises generating the predicted energy consumption based on vehicle data associated with the vehicle.

5. The method of claim 4, wherein the vehicle data comprises one or more of a vehicle speed, a vehicle battery charge rate, a vehicle acceleration, a vehicle fuel range, a vehicle fuel level, or a vehicle maintenance schedule.

6. The method of claim 1, further comprising:
prior to displaying the predicted energy consumption of the vehicle, updating the map based on the predicted energy consumption of the vehicle along the one or more trajectories of the predicted drive path; and
displaying the predicted energy consumption of the vehicle by displaying the updated map.

7. The method of claim 6, further comprising providing the updated map to a transportation management system (TMS) communicatively coupled to the vehicle.

8. The method of claim 1, wherein displaying the predicted energy consumption of the vehicle comprises populating a plurality of visual indicators corresponding to the predicted energy consumption of the vehicle along the one or more trajectories.

9. The method of claim 1, wherein displaying the predicted energy consumption of the vehicle comprises displaying varying colors corresponding to the predicted energy consumption of the vehicle along the one or more trajectories.

10. The method of claim 1, wherein at least one of the plurality of different points comprises a charging station or a fueling station.

11. The method of claim 1, wherein the predicted drive path comprises a first predicted drive path, the method further comprising:
detecting, by the computing system, one or more inputs corresponding at least in part to a deviation of the vehicle from the first predicted drive path; and
generating, by the computing system, a second predicted drive path based on the one or more inputs.

12. The method of claim 11, wherein the second predicted drive path extends between a current location of the vehicle and the final destination of the vehicle.

13. The method of claim 12, wherein the predicted energy consumption of the vehicle comprises a first predicted energy consumption, the method further comprising:
generating, by the computing system, and based at least in part on the second predicted drive path and the first predicted energy consumption, a second predicted energy consumption of the vehicle along one or more trajectories of the second predicted drive path; and
displaying, on the display of the computing system, the second predicted energy consumption of the vehicle along the one or more trajectories of the second predicted drive path, the second predicted energy consumption of the vehicle being displayed so as to at least partially overlay the second predicted drive path.

14. The method of claim 1, wherein the vehicle comprises an electric vehicle (EV), a battery electric vehicle (BEV), a hybrid electric vehicle (HEV), or a plug-in hybrid electric vehicle (PHEV).

15. The method of claim 1, wherein displaying the predicted energy consumption of the vehicle along the one or more trajectories of the predicted drive path further comprises:

displaying a first color for a first segment of the predicted drive path based on the remaining battery charge of the vehicle being predicted to be at a first battery charge level at the first segment; and
displaying a second color for a second segment of the predicted drive path based on the remaining battery charge of the vehicle being predicted to be at a second battery charge level at the second segment.

16. A non-transitory computer-readable medium comprising instructions that, when executed by one or more processors of one or more computing devices, cause the one or more processors to:
display, on a display of a computing system of a vehicle, a map of an environment external to the vehicle, the map including a predicted drive path extending between an initial location of the vehicle and a final destination of the vehicle within the environment;
receive, from a remote server and via a wireless communication network, historical consumption data associated with one or more other vehicles;
receive, from the vehicle, a battery charge level of the vehicle;
generate, by the computing system, and based at least in part on the predicted drive path, the battery charge level, and the historical consumption data, a predicted energy consumption of the vehicle along one or more trajectories of the predicted drive path; and
display, on the display of the computing system, the predicted energy consumption of the vehicle along the one or more trajectories of the predicted drive path, the predicted energy consumption comprising a remaining battery charge of the vehicle at each of a plurality of different points along the one or more trajectories between the initial location and the final destination of the predicted drive path, wherein the plurality of different points define a plurality of segments along the predicted drive path, each segment included in the plurality of segments having the same physical length or the same travel time, and the predicted energy consumption of the vehicle being displayed so as to at least partially overlay the predicted drive path.

17. A computing system for a vehicle, comprising:
one or more non-transitory computer-readable storage media including instructions; and
one or more processors coupled to the one or more non-transitory computer-readable storage media, the one or more processors configured to execute the instructions to:
display, on a display of the vehicle, a map of an environment external to the vehicle, the map including a predicted drive path extending between an initial location of the vehicle and a final destination of the vehicle within the environment;
receive, from a remote server and via a wireless communication network, historical consumption data associated with one or more other vehicles;
receive, from the vehicle, a battery charge level of the vehicle;
generate, by the computing system, and based at least in part on the predicted drive path, the battery charge level, and the historical consumption data, a predicted energy consumption of the vehicle along one or more trajectories of the predicted drive path; and
display, on the display of the vehicle, the predicted energy consumption of the vehicle along the one or more trajectories of the predicted drive path, the predicted energy consumption comprising a remaining battery charge of the vehicle at each of a plurality of different points along the one or more trajectories between the initial location and the final destination of the predicted drive path, wherein the plurality of different points define a plurality of segments along the predicted drive path, each segment included in the plurality of segments having the same physical length or the same travel time, and the predicted energy consumption of the vehicle being displayed so as to at least partially overlay the predicted drive path.

\* \* \* \* \*